United States Patent
Thomson et al.

[15] 3,643,257
[45] Feb. 15, 1972

[54] DOPPLER RADAR AUTOMATIC SIGNAL DETECTION APPARATUS

[72] Inventors: Don N. Thomson, King of Prussia; James J. Connolly, Center Square; Kenneth K. Zeiger, Morrisville, all of Pa.

[73] Assignee: The Magnavox Company, Fort Wayne, Ind.

[22] Filed: Sept. 10, 1969

[21] Appl. No.: 856,620

[52] U.S. Cl. ................................................. 343/7.7
[51] Int. Cl. ................................................. G01s 9/42
[58] Field of Search ................................................. 343/7.7

[56] References Cited

UNITED STATES PATENTS

| | | | |
|---|---|---|---|
| 3,078,458 | 2/1963 | Steinberg | 343/7.7 |
| 3,267,468 | 8/1966 | Stull, Jr. | 343/7.7 |
| 3,383,678 | 5/1968 | Palmer | 343/7.7 X |
| 3,392,387 | 7/1968 | Kirkpatrick | 343/7.7 X |
| 3,465,336 | 9/1969 | Fishbein et al. | 343/7.7 |

Primary Examiner—Malcolm F. Hubler
Attorney—Howson and Howson

[57] ABSTRACT

The electrical output of a noncoherent doppler radar is applied to a noise AGC system which varies the channel gain so as to maintain substantially constant the level of random noise, thereby counteracting the noise-level distorting effects of AGC in the radar I.F. amplifier. Variations in the radar output due to changes in strength or spread of clutter signals are reduced by a clutter control circuit including a self-adapting filter which automatically changes its lower-frequency cutoff skirt so as to increase the attenuation of clutter signals when the energy of the interfering clutter-signal components tends to increase. After passing through the noise AGC circuit and clutter control circuit in series, the energy of the resultant signal varies substantially only due to the presence or absence of desired moving-target-produced received signals, and is applied to an energy-responsive threshold circuit to produce automatically an output signal indicative of moving target presence or absence. Either the noise AGC circuit or the clutter control circuit can be used by itself without the other.

4 Claims, 4 Drawing Figures

INVENTORS:
DON N. THOMSON
JAMES J. CONNOLLY
KENNETH K. ZEIGER
BY Howson & Howson
ATTYS.

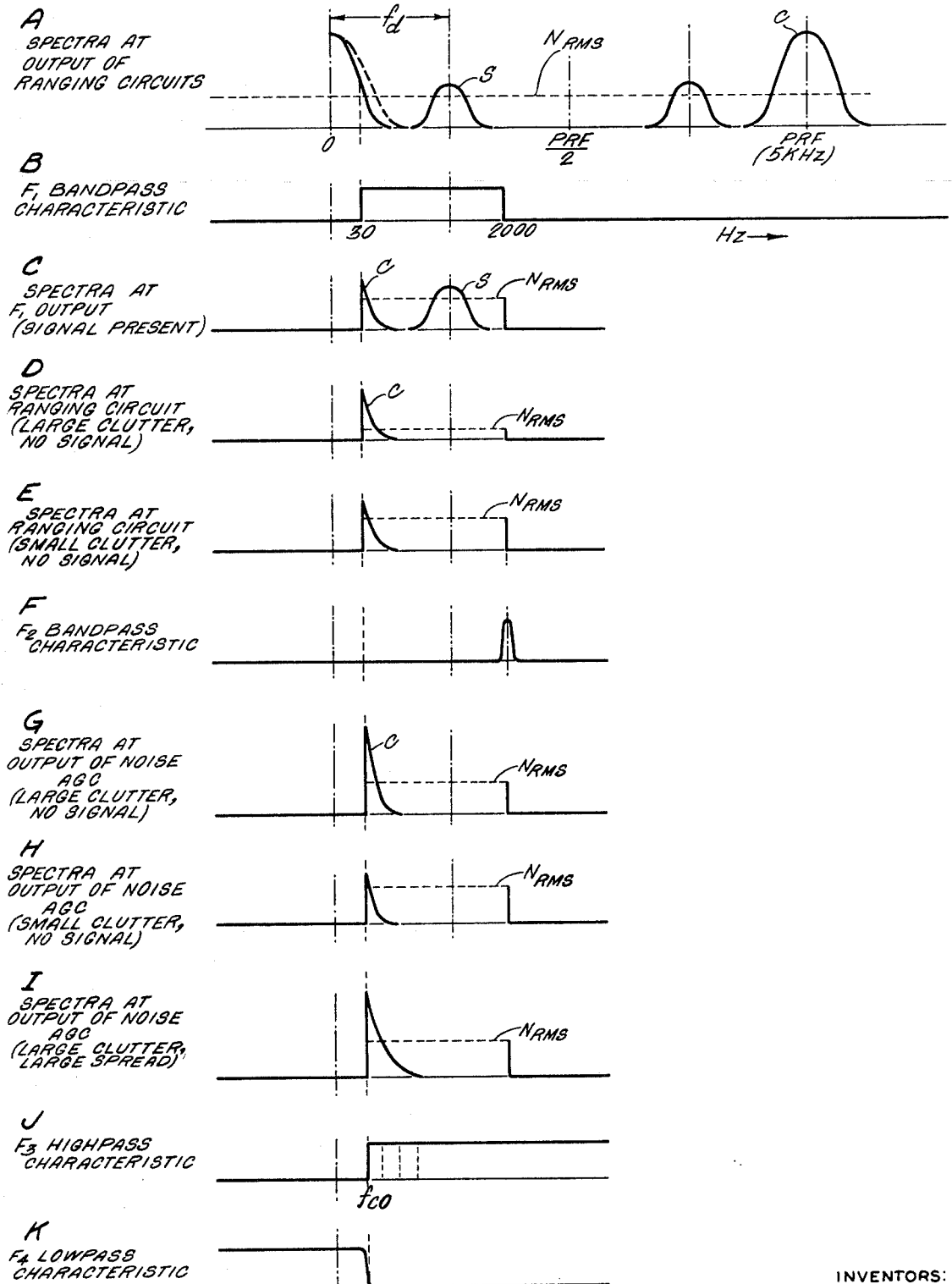

DOPPLER RADAR AUTOMATIC SIGNAL DETECTION APPARATUS

BACKGROUND OF THE INVENTION

There are a variety of applications in which it would be desirable to provide automatic detection of the presence or absence of a desired signal in the presence of interfering signals of varying strength. When the interfering signals are of substantial magnitude compared with the desired signal and also vary in level, the concept of deriving a signal indicative of the energy of the combined signals over predetermined time intervals and comparing the resultant energy-representing signal with a threshold cannot be utilized in many cases with a satisfactory degree of reliability and sensitivity. This is because the combined signal energy, and hence the energy-representing signal, will vary not only with the presence or absence of the desired signal but also with the above-mentioned variations in level of interfering signals. In such a situation, if the threshold level is set sufficiently high that it will not be exceeded due to variations in the interfering signals, the system will either not respond to the presence of a desired signal or will only respond to such a high level of the latter signal that the resultant automatic detection is undesirably insensitive. On the other hand, if the threshold level is set too low the system will be actuated in response to changes in energy of the interference signals, producing false indications of the presence of the desired signal.

One particular application in which this problem arises is in so-called noncoherent doppler radar systems, with particular reference to which the invention will be described in detail hereinafter. In typical forms of such apparatus, pulses of microwave energy from a transmitter are radiated by a directional antenna toward a region in which the presence of reflective moving targets is to be detected. Reflections from both moving and stationary targets are received by the radar, amplified, and subjected to a range-detecting operation which enables categorization of the reflections with respect to distance from the transmitter. Those reflections produced by objects moving with respect to other fixed or reference objects, such as the ground, are shifted in frequency due to the doppler effect, and are enhanced in the combined signal by appropriate filtering devices. The reflected signals received from the stationary or reference objects are commonly referred to as "clutter" signals and are relatively easy to separate from the desired moving-target signals when the target-object velocities are large and the frequency differences between moving-target signals and clutter signals correspondingly large. However, for low velocities of targets substantial overlap between frequency components of the clutter signals and of the moving target signals may occur, rendering discrimination between them on the basis of frequency either difficult or impossible. That is, if frequency discrimination between clutter and moving-target signals is to be provided by positioning of the lower-frequency skirt of a high-pass or band-pass filter, the skirt can be positioned high enough in frequency to reject all clutter, but in this event slowly moving targets will not be detected; on the other hand, if the filter skirt is positioned too low in frequency, low-velocity moving target signals will be passed by the filter but will be obscured by clutter signals having similar frequency components. Ordinarily, therefore, the lower-frequency filter skirt will be positioned just sufficiently high in frequency to prevent frequent passage of clutter signals of a strength such as to obscure the desired moving-target signals, and no higher. Moving targets having velocities below that corresponding to the selected filter-skirt position will then not be detected by such a system.

If the clutter signals are constant in strength and frequency spread, it would still be possible to detect the presence or absence of desired moving-target signals even though the filter characteristics were such as to permit substantial overlapping of clutter signals into the selected pass band. This could be accomplished by means of circuits which would produce a signal representing the energy of the combined clutter and moving-target signals during any particular pulse-reflection interval; if a target signal were present, the energy-representing signal would rise above a reference threshold and produce a "target present" signal, and otherwise would produce a "no target" signal. However, the amount of energy due to clutter signal passing through the filter varies in response to changes in both the clutter signal strength and the frequency-spectrum spread of the clutter signal, which readily occur due to such factors as minor movement of vegetation and differences or variations in reflectivity of nominally-stationary reflecting objects. Such variations will have the same effect as the presence of a desired signal, and will render unreliable the final output indication of target presence. Accordingly, using such prior art techniques it would be necessary to position the filter skirt sufficiently high in frequency to attenuate substantially completely all clutter-frequency components, thereby inherently and undesirably preventing the passage and detection of target signals due to slowly-moving objects.

A further problem arises with respect to the random noise unavoidably introduced into the signal channel in any radar system receiver. Such noise fluctuates randomly in amplitude and hence makes it difficult or impossible to detect a small desired signal in the presence of such noise by ordinary amplitude detection. If the random noise level remained substantially constant, it would again be possible to detect the presence or absence of a desired signal by sensing changes in the energy of the combined desired signal and noise. However, in most practical systems the noise level varies unpredictably. For example, the receiver amplifier of noncoherent doppler radars is usually provided with automatic gain control (AGC) operating on the total received signal (usually dominated by clutter) to prevent overloading of the output of the amplifier, and such AGC normally operates inherently to produce wide variations in the level of random noise at the amplifier output. This again will produce the above-mentioned difficulty in attempting to provide an appropriate and reliable setting of any threshold device supplied with a signal representative of the energy of combined signal and random-noise energy and intended to discriminate between the presence and absence of the desired moving-target signals.

In connection with the above-mentioned use of an AGC system in the receiver amplifier, it will be appreciated that the received signals from moving and fixed objects, while largely separate in the frequency domain, are superimposed in amplitude in the time domain. Accordingly, if strong received clutter-signals cause overload of a later stage in the amplifier, the desired moving-target signal variations are essentially lost, and it is therefore important in such circumstances automatically to reduce the gain of the amplifier so that the signals at the output of the amplifier are in the linear-amplification region thereof, or at least below the level of strong overload and limiting.

In some applications which can be envisioned, the variations due to the changing level of random noise may be important and the variations due to clutter changes unimportant, and vice versa for other systems. However, in usual types of practical noncoherent doppler radar systems, both types of variation will occur and will present severe limitations on the ability to provide reliable automatic detection of weak signals from moving targets over a wide range of velocities.

Accordingly it is an object of the invention to provide new and useful apparatus for sensing the presence or absence of desired signals in the presence of interfering signals.

Another object is to provide such apparatus capable of detecting weak desired signals in the presence of random noise of varying level.

A further object is to provide such detection which is automatic, in that it automatically produces a signal representative of said absence or presence of desired signals.

Another object is to provide new and useful apparatus for automatically detecting desired signals over a wide range of frequencies despite varying degrees of overlap of undesired interfering frequency components into said range.

It is also an object to increase the range of velocities of moving targets for which moving-target-indicating signals may be automatically detected in a noncoherent doppler radar system.

A further object is to provide a new and useful noncoherent doppler radar system with means for automatically detecting the presence or absence of desired moving target signals.

Another object is to provide such an improved system in which a receiver-amplifier employing automatic gain control is employed.

It is also an object to provide the latter type of system in which received clutter signals vary with respect to strength and frequency spread, and in which the detection of lower-velocity moving targets is enhanced.

Another object is to provide a new and useful noncoherent doppler radar system for automatically detecting the presence or absence of moving target objects despite the presence of varying and substantial levels of clutter signal and random noise.

SUMMARY OF INVENTION

These and other objects of the invention are achieved by the provision of an automatic signal-detection system in which an energy-threshold comparator is used to detect changes in energy of a combined signal comprising desired signal components extending through a predetermined range, interfering signal components of varying energy overlapping into one end of said range, and random noise extending through said range, said system comprising a noise AGC system which selectively responds to, and acts upon, the varying random-noise level to return it to a substantially constant level prior to application of the combined noise and signal to the energy-threshold comparator; said system also comprising a clutter-control circuit including a self-adapting filter (SAF) through which the combined-signal components are passed prior to application to the energy-threshold comparator, the frequency position of the skirt of the SAF being automatically varied so as to reject or attenuate said interfering components more strongly when the energy thereof tends to increase. Preferably the noise AGC and the SAF clutter-control circuit are connected in series in the signal channel so that the effects of variable random-noise level and variable interfering-signal strength and frequency spread are all mitigated, and the threshold comparator thereby enabled to operate sensitively and reliably.

In the preferred embodiment, a noncoherent doppler radar having the usual audio bandpass filter for separating moving-target frequency components from clutter components supplies its output to the input of a noise AGC circuit comprising variable-gain means, a noise filter connected to the output of the variable-gain means to select noise components outside the frequency range normally occupied by either desired target signals or clutter signals, and a detector and low-pass filter combination for producing a control signal indicative of the level of noise in the output of the variable-gain means and for applying the control signal to the variable-gain device in the polarity to maintain substantially constant the noise level at the output of the variable-gain device. The output of the variable-gain device is also passed through a self-adapting filter, the lower-frequency cutoff skirt of which is varied in frequency position automatically so as to move upward in frequency and reject the clutter-frequency components more strongly when they become stronger or more widely spread in frequency so as to tend to introduce greater contamination into the desired signal. In one preferred embodiment, automatic control of the SAF may be provided by means of a filter responsive to the input to the SAF selectively to pass frequency components in the frequency range of the contaminating clutter components, a detector and low-pass filter arrangement supplied with the output of the latter filter for producing a signal representative of the energy of the contaminating clutter frequency components, and an appropriate circuit arrangement responsive to the control signal for varying the lower frequency cutoff skirt of the SAF in the direction to oppose increases in clutter contamination. Alternatively, the output of the SAF can be fed back to control the position of its lower-frequency skirt, so as to maintain the clutter contamination energy at or below a predetermined value by servo-feedback control. The output of the SAF is supplied to an energy-responsive threshold comparison circuit, which typically may comprise an integrator followed by a voltage comparator, by means of which the processed combined signal is compared with a variable threshold to operate an alarm when the threshold is exceeded; alternatively, the output of the SAF may be supplied to a probability ratio sequential detector (PRSD) containing the usual two thresholding devices and operating in a manner now well known in the art.

In some applications either the noise AGC system or the clutter control circuit of the invention may be used by itself, rather than in tandem combination with the other.

Because the energy of frequency components due to random noise or clutter interference is maintained substantially constant at the input to the integrator and thresholding circuit, any change in the energy of the combined signal, and in the output of the integrator, can properly be ascribed to the presence of the desired moving-target signals; or at least the probability of thereby obtaining a correct decision as to the presence of such target objects is enhanced. The sensitivity and reliability of the system is thereby improved or, alternatively, the power requirements of the equipment can be reduced for the same sensitivity and reliability.

BRIEF DESCRIPTION OF FIGURES

These and other objects and features of the invention will be more readily understood from a consideration of the following detailed description, taken in connection with the accompanying drawings, in which:

FIG. 2 comprises a series of graphical representations plotted to a common frequency scale, to which reference will be made in explaining certain characteristics and operations of the system of the invention.

DESCRIPTION OF SPECIFIC EMBODIMENTS

Figure 1:
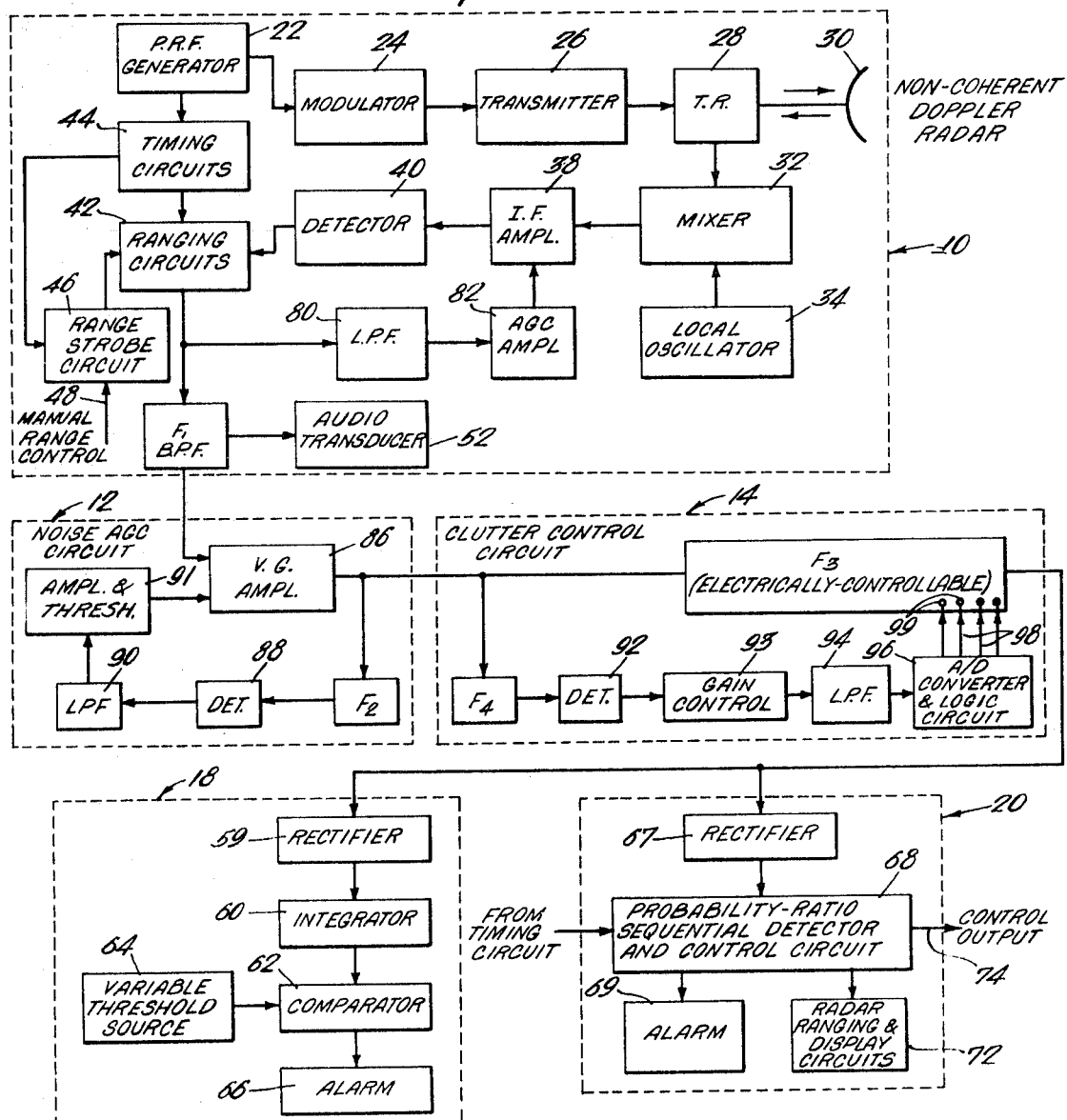
FIG. 1 is a block diagram illustrating a conventional noncoherent doppler radar system to which has been added an automatic detection system in accordance with the invention.

Referring to the embodiment of the invention shown in FIG. 1 by way of example only, a noncoherent doppler radar 10 supplies output signals to the series combination of a noise AGC circuit 12 and a clutter control circuit 14, the output of the latter circuit being supplied in parallel to energy-threshold detection circuits 18 and 20.

The noncoherent doppler radar 10 may be entirely conventional. In this example it comprises a pulse repetition frequency (PRF) generator 22 supplying a modulator 24 for modulating the transmitter 26 to cause it to transmit time-spaced pulses of microwave energy into space through a T-R duplexer 28 and a suitable directive antenna 30. Reflected microwave energy is received by the antenna 30 and passed through the T-R duplexer 28 to the usual microwave mixer 32, to which local-oscillator signals are also supplied in the usual way from a local oscillator 34, which in turn may be provided with appropriate automatic-frequency-control circuits (not shown) as is usual in such equipment. The output of mixer 32 is amplified in an intermediate-frequency (I.F.) amplifier 38 and then supplied to a detector 40, which derives video voltage variations corresponding to the envelope of the received, reflected, microwave signals. The video signal from detector 40 is passed through ranging circuits 42, which are also supplied with timing impulses generated by the timing circuits 44 in response to synchronizing signals from PRF generator 22.

Ranging circuits 42 in this example may comprise a gate circuit which permits passage only of signals occuring during a short gate-pulse interval following each transmitted pulse by a controlledly-variable delay. The delay of the gating pulses with respect to transmitter pulses is variable in response to control signals applied thereto from a range strobe circuit 46, the internal operations of which are timed by signals supplied from the timing circuits 44. Range strobe circuit 46 supplies the ranging circuits 42 with a series of gating pulses differently delayed with respect to transmitter pulses according to a predetermined pattern. For example, it may first produce gating pulses delayed with respect to transmitter pulses by a predetermined short delay, corresponding to a short target range, then after a number of such gating pulses the gate pulse delay may be automatically changed to a slightly larger value corresponding to a slightly greater range, and so on, until the complete range interval of interest has been explored in this manner. In addition, range strobe circuit 46 is preferably provided with a manual range control input 48 which, when actuated, terminates the automatic range strobing action and causes the delay of the gating pulses to be controllably adjustable by hand. The manual range control 48 is preferably calibrated so that the operator can readily determine visually the range being investigated for a given adjustment of the control. Accordingly, output from the ranging circuits 42 consists substantially only of random noise plus frequency components due to reflections from objects in the range bin corresponding to the delay of the contemporaneous gating pulse applied to the ranging circuits.

Output from the ranging circuits is passed through a bandpass filter $F_1$ to an audio transducer 52, which may be a simple pair of earphones, the acoustic output of which is monitored aurally by the operator.

Briefly, in the known operations of the radar 10 transmitted pulses are reflected from fixed reference objects such as the ground and objects attached thereto, including for example various forms of vegetation, as well as from desired moving-target objects. For example, in one intended use of such apparatus for military surveillance in ground combat areas the radar is of a compact, lightweight low-power form portable by an operator in the field, and the antenna is small and manually orientable by the operator. Desired moving-target objects may, for example, comprise vehicles moving on the ground. The reflections returned to the antenna 30 comprise the fixed-object reflections or "clutter" signals, combined with the desired reflections from moving-target objects which have microwave frequencies differing from those of the clutter signals due to a doppler shift proportional to the velocity of the moving-target objects. Since the transmitter pulse comprises a spectrum of frequency components clustered around harmonics of the pulse repetition rate, the reflections contain corresponding frequency components, except that hose reflected from moving target objects are shifted substantially in frequency and those from fixed objects are slightly dispersed in frequency to a variable extent depending upon small motions of the reference objects, such as the motion of vegetation in the presence of strong wind. As to strength of reflections, the more remote the target object and the smaller it is, the weaker the reflection. In the case of reflections from ground, reflections at near ranges are very strong, and their strength falls off rapidly with increasing range.

The above-described combined received signal, after being heterodyned to intermediate frequency by mixer 32, passes through the I.F. amplifier 38, which has a passband substantially equal to the inverse of the transmitted pulse width and therefore passes frequency components differing from the center intermediate frequency by relatively high multiples of the pulse repetition frequency, so that the pulse shape is largely preserved in the video output of detector 40. As mentioned above, the instantaneous condition of the range strobe circuit 46 or the setting of manual range control 48 determines the particular increment of range which is being examined and which is being represented by the output of the ranging circuits 42. The frequency components in the output of the ranging circuits include those produced by heterodyning, or beating-together, of the doppler-shifted signals and the clutter signals from reference objects.

At A of FIG. 2 there are represented graphically and schematically the lower-frequency portion of the spectrum of the clutter signal C, and of the spectrum of the desired target-reflected signals S which have been shifted by the doppler shift $f_d$. In addition there is shown the effective or RMS random-noise level $N_{RMS}$ due to such factors as thermally-generated receiver noise, which is assumed to have a substantially uniform spectral density. For more slowly-moving targets the signal S will have lower frequency components and a spectrum position closer to the clutter signals C, and for higher-velocity targets will be shifted farther to the right toward higher frequencies. The broken curved line illustrates the clutter signal C when its spectrum has been broadened, which can occur randomly and unpredictably as mentioned above due to such factors as wind. What is desired is to detect the presence or absence of the moving-target signal S in the presence of the clutter signal C and of the random noise $N_{RMS}$.

At B of FIG. 2 there is shown an idealized bandpass characteristic for the filter $F_1$, which as shown has a passband positioned to embrace the signal S and a substantial range on each side thereof so as to accommodate different velocities of target motion, while rejecting at least a substantial portion of the clutter-signal spectrum. The result is that shown at C of FIG. 2, which represents an idealized version of the frequency spectra at the output of filter $F_1$. As shown, the output of filter $F_1$ comprises the desired signal S, the noise $N_{RMS}$ extending throughout the passband of the filter, and the portion of one edge or "tail" of the clutter spectrum C.

In order better to understand the operation of the system, some representative typical numerical values will be helpful. As an example, the pulse repetition frequency may be 5,000 Hz. when X-band microwaves are used, and the passband of filter $F_1$ may extend from about 30 Hz. to about 2,000 Hz..

The output of filter $F_1$, supplied to audio transducer 52, is listened-to by the operator, who has been trained to detect with reasonable reliability the presence or absence of the audible tone due to the signal S despite substantial interference from the noise $N_{RMS}$ and from the tails of the clutter signal C. When the energy of interfering signals in the passband of filter $F_1$ increases, a point will be reached at which the operator will be unable reliably to detect the presence or absence of the audible tone due to signal S. Below this point, however, reasonably accurate detection can be accomplished, with sufficient concentration by the operator. With the range strobe circuit 46 in its automatic strobe operation, the operator will normally listen until he detects a signal due to a moving target, and then actuate and operate the manual range control 48 to hold the range gate at a position corresponding to the range of the target, thereby to keep the target under surveillance, i.e., to "track" it manually.

One prime difficulty with this prior-art system is that it requires continuous intense concentration by the operator, which not only produces fatigue and resultant inefficient monitoring and detection by the operator, but also requires all of his attention while in the field when at least occasional attention to other activities may be of substantial or vital importance. If, on the other hand, an automatic detection system can be provided which will produce an alarm signal in response to the presence of a moving target object, the operator may rest or direct his attention elsewhere until the alarm occurs, at which time he may direct his attention to aural surveillance and tracking of a target producing the alarm.

One form of automatic detection apparatus shown in FIG. 1 is the energy-threshold detection circuit 18, comprising a rectifier 59, an integrator 60, a voltage comparator 62 supplied with the output of the integrator and with a threshold voltage from variable-threshold source 64, and an alarm 66 supplied from the comparator. The rectifier 59 is supplied with the output of filter $F_1$ by way of the noise AGC circuit 12 and the clutter control circuit 14. Integrator 60 may be of the conventional RC type or of the integrate-and-dump type in which "dumping" or discharging is provided in response to a timing pulse supplied from timing circuits 44 just prior to each change in the range bin position during range strobing, by way of an appropriate interconnection (not shown). The function of integrator 60 is to produce an output voltage which varies in proportion to the energy of the signal supplied thereto. Accordingly, if a desired moving-target signal is present the integrator will produce a larger output voltage than if that signal is absent, provided that interfering clutter signals and noise remain constant.

The comparator 62 receives the energy-representing output voltage of integrator 60 and compares it with a variable voltage from threshold source 64. If the energy-representing voltage exceeds the threshold voltage, the comparator delivers an output signal to operate alarm 66, which may be visual or aural. The voltage from the variable threshold source 64 is ideally set just sufficiently high that the alarm 66 is not operated in the absence of the desired moving-target signal but is operated when moving-target signals are applied to the integrator 60. Also shown in FIG. 1 as being supplied with the output of the clutter control circuit is the energy-threshold detection circuit 20, comprising rectifier 67 and a probability-ratio-sequential-detector (PRSD) and control circuit 68 for controlling operation of alarm 69 and of radar ranging and display circuit 72. In some cases only one of the energy-threshold detection circuits 18 and 20 will be utilized, but both may be used simultaneously to advantage in some applications. Suitable apparatus for use in the PRSD and control 68 will be apparent to one skilled in the art from a consideration of U.S. Pat. No. 3,253,277 of G. W. Preston et al., issued May 24, 1966 and U.S. Pat. No. 3,271,762 of K. K. Zeiger, issued Sept. 6, 1966, both included herein by reference. In general, the PRSD normally includes a pulse-to-pulse integrator supplied with the output of the rectifier, and a parallel combination of a lower threshold device and an upper threshold device both supplied with the output of the integrator. After a number of transmitted pulses have occurred, either the upper threshold device or the lower threshold device, or neither, will have been operated by the received signal. In one preferred form, if neither threshold is exceeded after a predetermined number of transmitted pulses a synthetic indication is generated that the upper threshold has been exceeded.

In the FIG. 1 arrangement, the alarm output of the PRSD and control circuit 68 is supplied to alarm 69, for example a lamp. Another output, supplied to the radar ranging and display unit 72, can be used to provide a visual indication of the presence of a moving target at a particular range. Another output at line 74 comprises a control output, which may be utilized to control antenna scanning in cases in which such scanning is automatically controllable, or to control the generation of transmitter pulses or the progress of range exploration by the range strobe circuit 46. However, the particular construction, operation and use of the PRSD device is not critical in connection with the present invention. The significant fact with respect to the PRSD for the present purpose is that it utilizes threshold detection of the energy in the received signal applied thereto.

Accordingly, both in the case of the PRSD-type of energy-threshold detection apparatus 20 and in the case of the more elementary energy-threshold detection apparatus 18, the reliability of indication of the presence or absence of desired moving-target signals is substantially reduced if the energy due to clutter signals and/or random noise also varies substantially and unpredictably. It will now be pointed out wherein such undesired interfering variations arise in the output of radar 10, and how they may produce unreliable output indications in the absence of the noise AGC circuit 12 and the clutter control circuit 14 of the invention.

Radar 10 conventionally employs an AGC system comprising low-pass filter 80 and AGC amplifier 82 serving to feed back signals derived from the output of ranging circuits 42 to a gain-control terminal of the I.F. amplifier 38. The purpose of such AGC is to prevent such overload of I.F. amplifier 38 as would tend to reduce or eliminate variations in the output of the I.F. amplifier due to the desired moving-target signals. For this purpose low-pass filter 80 preferably has a time constant as long as possible consistent with remaining less than the period during which the ranging circuits monitor a particular range bin. If the clutter signal power were reasonably constant, the fact that it is normally much greater than the moving-target signal would cause it to dominate the AGC circuit and maintain the I.F. amplifier gain substantially constant in a given application. However, instead, the strength of the clutter signal varies greatly with range, and as the range strobe circuit 46 strobes outwardly in range the clutter signal decreases from a very high value to a relatively low value, and the gain of the I.F. amplifier 38 is thereby automatically varied from a relatively low value to a very high value.

The effect of this gain variation on the noise from the I.F. amplifier is illustrated at D and E of FIG. 2. D represents the case for a strong clutter signal and E that for a weak clutter signal in the input to the I.F. amplifier. Because of the AGC action, the clutter signal at the output of the I.F. amplifier is nearly the same in the two cases, but the effective noise level $N_{RMS}$ is much higher when the clutter is small. This change in noise level corresponds to a very substantial difference in energy of the spectra for the two conditions shown at D and E, even though no moving-target signal is present. From the foregoing it will be apparent that this change in energy will produce false output indications from the energy-threshold circuits unless the thresholds are set so high that this cannot occur, in which case weak desired signals will not be detected by the threshold devices.

It is this difficulty which is overcome in accordance with the invention by the use of the noise AGC circuit 12. Output from filter $F_1$ is supplied to variable-gain amplifier 86, the output of which is supplied to a filter $F_2$ having a frequency-response characteristic such as to pass substantially only noise frequency components, free of clutter signals and moving-target signals. As shown at F of FIG. 2, a suitable position for the bandpass characteristic of $F_2$ is at the extreme higher-frequency edge of the bandpass characteristic of filter $F_1$. With this position, the clutter signals do not extend into the passband of $F_2$ and, while increases in velocity of moving targets tends to shift the moving-target signal higher in frequency, the velocities of moving targets encountered in use of the equipment are not sufficiently high to introduce substantial interference in the passband of $F_2$.

Accordingly, the output of filter $F_2$ varies only with, and is a measure of, the random-noise level $N_{RMS}$. To derive therefrom a control signal varying with the latter level, the output of $F_2$ is passed through a detector 88 and a low-pass filter 90 to produce a direct-voltage control signal varying in accordance with variations in the noise level of $N_{RMS}$; an amplifier and adjustable threshold circuit 91 can be included in this feedback circuit if desired. The latter control signal is applied to the gain-control terminal of variable-gain amplifier 86 to vary its gain in the direction to maintain the noise level at the output of amplifier 86 substantially constant at a level determined by the adjustment of the threshold in amplifier and threshold 91. In effect, the uniform noise level which was distorted by the AGC in the radar 10 is thereby restored to a substantially uniform level. Accordingly, the combined signal entering into the energy-threshold detection circuits 18 and 20 does not contain the above-described noise energy variations, and the threshold levels therein can therefore be set for more reliable and sensitive detection.

As an example, utilizing X-band microwave transmissions, doppler shifts $f_d$ greater than 1.7 kHz. can be produced only by targets having velocities in excess of 50 knots, which is highly unlikely for any targets in a ground combat environment. Bandpass filter $F_2$ may then be selected so that its center frequency is at about 2 kHz. and its response less than half-maximum at about 1.7 kHz. Apparatus for producing narrow passband filters is so well known that it is unnecessary to show and describe specific apparatus for this function. As an example, only, typically the desired bandpass characteristic may be provided by two inductance-capacitance circuits connected as the loads for two successive amplifying stages.

Since the bandpass filter $F_1$ has removed the DC component of the received and amplified signals, the noise signals at the output of filter $F_2$ are in alternating form. Detector 88 serves to rectify this signal, as by half-wave or full-wave rectification. Such rectifying circuits being well known in the art, it is unnecessary to show or describe them in detail therein. Similarly, the low-pass filter 90 may take any of a variety of known forms, such as a series of resistance-capacitance sections in tandem serving in effect to average the detected noise signal, thereby to produce the desired slowly-varying DC control voltage for variation of the gain of variable-gain amplifier 86. Variable-gain amplifiers suitable for such purposes are also well known in the art, and need not be exemplified in detail; the gain-varying mechanism may, for example, comprise a voltage divider arrangement, one of the resistances of the voltage divider being shunted by a field-effect transistor whose conductivity is varied in accordance with the control signal from low-pass filter 90. Many suitable forms of implementation of this variable-gain device will occur to one skilled in the art.

The overall effect of the noise AGC circuit is illustrated at G and H of FIG. 2. G and H of FIG. 2 show the output of the noise AGC circuit for large clutter and small clutter respectively. Unlike the situation shown at D and E of FIG. 2, in this case the effective noise level $N_{RMS}$ remains substantially constant despite large changes in clutter signal.

Turning now to the problem created by variations in clutter interference, as illustrated for example at G and H of FIG. 2 the clutter signals supplied to clutter control circuit 14 may vary greatly in strength, and as shown at A and I of FIG. 2, the frequency spread of the clutter may also vary unpredictably due to differences in terrain and in the motions of parts thereof. For this reason the energy of the contaminating components due to clutter signals (i.e., those which overlap into the lower-frequency end of the passband of filter $F_1$) also varies unpredictably and, unless some special provision is made, will render the energy-threshold apparatus less reliable or less sensitive. Comparing the waveforms at B and C of FIG. 2, it will be seen that it would be possible to design the filter $F_1$ so that its lower-frequency skirt occurs at a higher-frequency position, such that the desired moving-target signal S is passed and the clutter signal C substantially completely rejected. In this event the clutter energy transmitted by filter $F_1$ would be so small that variations in this energy would have little harmful effect. However, if this is done then slower moving targets will produce frequency components so low in frequency as to be attenuated or eliminated by filter $F_1$, and hence will not be detected. Such an arrangement would therefore mean that, in order to obtain high reliability and sensitivity, detection of slower moving targets would have to be sacrificed at all times. Clutter control circuit 14 mitigates this problem in the manner now to be described.

At J of FIG. 2 there is represented the spectral characteristic of self-adjusting filter $F_3$, in idealized form. The characteristic is that of a high-pass filter having a lower-frequency skirt which is automatically varied between the lower-frequency position shown in full line and the three higher-frequency positions shown in broken line. The operation of the clutter control circuit is such that when the clutter-signal energy contaminating the output of filter $F_1$ is small, for example as shown at H of FIG. 2, the lower-frequency skirt of filter $F_3$ occupies the position shown in full line. This is its lowest-frequency position, and will permit passage of desired signals from relatively-slowly moving target objects so as to enable their detection by the system, and will reject enough of the weak clutter signal to prevent serious interference thereby. When the clutter-signal energy in the passband of filter $F_1$ increases, due to increasing clutter strength or frequency spread, as shown for example at I of FIG. 2, the lower-frequency skirt of filter $F_3$ automatically moves upward in frequency so as to reject the increased clutter signal contamination, or greatly attenuate it. In this way the reliability and sensitivity of the automatic detection system is preserved, although the very slowly moving target objects cannot under the latter conditions be detected with reliability. The operational advantage over the prior-art arrangement previously described lies in the fact that the very slowly moving targets can be detected reliably when the clutter contamination is small.

In the embodiment illustrated in FIG. 1, the clutter control circuit 14 operates to sense the energy of contaminating clutter signals in the output of filter $F_1$ and to switch the position of the lower frequency cutoff skirt of filter $F_3$ to the appropriate one of its four positions represented at J of FIG. 2. Accordingly the low-pass filter $F_4$ is connected to the input line for filter $F_3$ and has a higher-frequency cutoff approximately the same as the lowest frequency position of the lower-frequency skirt of filter $F_3$. Filter $F_4$ therefore selectively passes frequency components of the contaminating clutter signal lying within a predetermined frequency band at the lower end of the passband of filter $F_1$. The output of filter $F_4$ is passed through a detector 92, a gain-control 93 and a low-pass filter 94, corresponding elements of which may be similar to corresponding elements of the noise AGC circuit, although they also may take other conventional forms. These elements serve to produce at the output of the low-pass filter 94 a slowly-varying direct voltage varying in accordance with the energy of the clutter signals contaminating the desired moving-target signals. In this embodiment the latter control signal is applied to the input of analog-to-digital converter and logic circuit 96, which has four output lines such as 98. Analog-to-digital converter and logic circuit 96 produces an output signal only on a particular one of its output lines 98 when the value of the control signal from the low-pass filter 94 is below a first level, produces a signal only on a second different predetermined one of its output lines 98 when the control signal is between the latter first level and a higher second level, produces an output only on a predetermined third different one of its output lines 98 when the control signal is between said second level and a third higher level, and produces an output signal only on the fourth of the output lines 98 when the control signal is above the third level. Each of the four output lines such as 98 is connected to a different one of four corresponding associated control terminals such as 99 of filter $F_3$. Suitable circuits for producing this simple quantizing and digitizing operation are well known in the computer and logic art and hence need not be shown or described herein in detail.

One preferred form of the filter $F_3$ is one having a plurality of filter sections, four of which are electrically connectable into the filter circuit in response to closing of appropriate electronic switches. Each of the four controllably-connectable filter sections will produce a different one of the lower-frequency skirt positions shown at J of FIG. 2. Accordingly, depending upon the energy of the contaminating clutter signals passing through filter $F_4$, a particular one of the control terminals 99 will be supplied with a signal and will respond to connect that one of the four filter sections which provides the lower frequency skirt position appropriate for the then-existing degree of clutter contamination. If desired, instead of electronically substituting different filter sections in filter $F_3$, filter sections may be added or removed to produce the progressive change in lower frequency skirt position. That is, for the lowest position of the lower-frequency skirt one such filter section may be connected, for the next-higher frequency position a second filter section may be added, and so on. Since these arrangements involve merely the electronic switching of filter sections in and out of a filter circuit in response to signals applied to the control terminals 99, the circuit can readily be implemented by one skilled in the art in a variety of ways and hence need not be shown or described in further detail herein.

Preferably the switching operations described with respect to the clutter control circuit 14 occur rapidly, in a small fraction of the time over which integrated observations are made by the energy-threshold equipment.

Among other variants of the clutter control circuit 14 which will occur to one skilled in the art, one particularly useful type supplies the input terminals of filter $F_4$ with the output of filter $F_3$, compares the output signal from filter $F_4$ with a reference threshold, and continuously changes the lower-frequency skirt position of filter $F_3$ so as to maintain the fed-back signals substantially equal to the reference threshold. This control can be implemented by constructing $F_3$ with active or passive filter sections and controlling the resistive component thereof electronically, as by use of field-effect transistors. In the design of such feedback clutter-control systems using continuous variation of the lower-frequency skirt of $F_3$, the selection of the selectivity of the latter skirt and of the higher-frequency skirt of $F_4$ is significant for best operation. Specifically, $F_4$ preferably has a skirt selectivity of at least about 24 db. per octave to minimize possible undersired attenuation of targets at frequencies near the upper cutoff of $F_4$. A preferred arrangement of $F_3$ is then a two-section active high-pass filter with the feedback taken from the midpoint of the two sections. Such arrangement of $F_3$ and $F_4$ provides good control of output clutter residue when the input clutter to the filter has a spectrum typical of that for non-coherent doppler radar. These and other suitable arrangements can also readily be implemented by one skilled in the art, in view of the teachings herein.

It is noted that a signal from a true moving target which is moving slowly may produce frequency components in the upper end of the passband of filter $F_4$, and that if these components are sufficiently strong they may tend to actuate the clutter control circuit so as to raise the lower-frequency cutoff of filter $F_3$ and interfere with the reception of desired signals from slower-moving targets. However, such interfering signals are rarely strong enough to interfere with the detection of desired signals. As is the case with other elements in the system, adjustment and selection of parameter values for the clutter control circuit is such as to provide the desired reliability of response to the presence or absence of moving-target signals, while still maintaining the best possible sensitivity for a large range of target-object velocities. It is noted that certain probability of producing false alarms can be tolerated in the system, since once an alarm is given the operator can then direct his attention to determining whether a true moving target is present or not.

Figure 3:
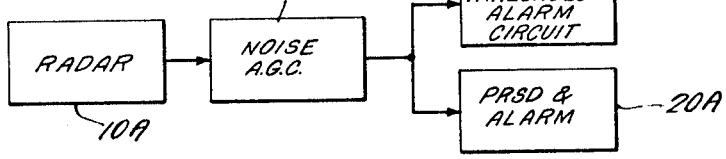
FIGS. 3 and 4 are block diagrams illustrating alternative arrangements in accordance with the invention.

FIG. 3 illustrates an arrangement of the system in which the noise AGC of the invention is utilized but the clutter control circuit is not. Parts corresponding to those of FIG. 1 are indicated by corresponding numerals with the suffix A. Such an arrangement would be useful, for example, in situations where only higher-velocity targets are of interest and therefor the low-frequency cutoff of filter $F_1$ can be raised to substantially completely eliminate clutter signals under all operating conditions. The difficulty due to varying noise level would then still remain, and would be compensated for by the use of the noise AGC system.

Figure 4:
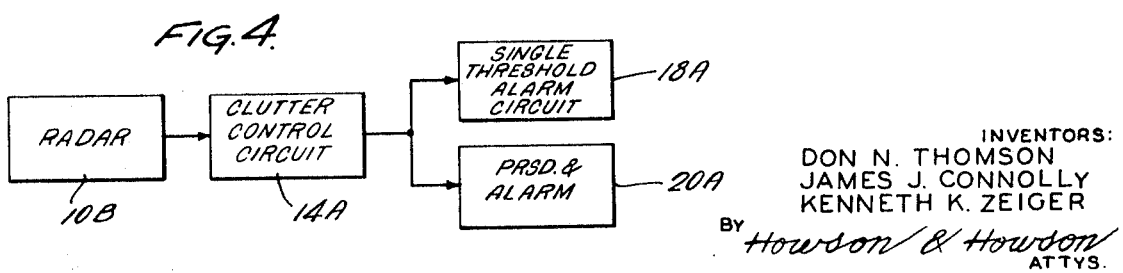

FIG. 4 illustrates a system in which the noise AGC system is not utilized but the clutter control circuit of the invention is. Such an arrangement may be useful, for example, where the basic radar is of the coherent, rather than the noncoherent type, and apparatus is included therein for maintaining the noise level constant. In this event, interference due to clutter is the primary problem in automatic detection, and use of the clutter control circuit 14A mitigates the problems due to clutter variations.

It is noted that when the clutter control circuit is used without the noise AGC circuit it is possible to eliminate filter $F_1$.

Other variations of construction and application of the invention will readily appear to one skilled in the art in view of the foregoing teachings. Thus, while the invention has been described in the interest of definiteness with particular reference to specific embodiments thereof, it may be embodied in any of a variety of forms diverse from those particularly described without departing from the scope of the invention.

We claim:

1. In a noncoherent doppler radar system for detecting target objects moving with respect to reference objects by receiving and sensing signals from said target objects having frequency components doppler-shifted with respect to frequency components of signals from said reference objects, said system comprising means for receiving said signals from said target objects and from said reference objects, first variable-gain means for amplifying said received signals from said target objects and from said reference objects, first frequency-selective means for selectively enhancing said doppler-shifted components with respect to frequency components of said signal from said reference objects, automatic gain control means for controlledly varying the gain of said first amplifying means in response to the strength of signals from said first amplifying means and in the sense to reduce the gain when said received signals increase in strength, the improvement which comprises:

noise AGC means, comprising second amplifying means supplied with the output of said first frequency-selective means, second frequency-selective means supplied with the output of said second amplifying means for selectively passing noise frequency components lying outside the spectra of frequency components produced by target objects and reference objects, means for generating a gain-control signal in response to noise frequency components passed by said second frequency-selective means, and means for varying the gain of said second amplifying means in response to said control signal, in the sense to maintain substantially constant the level of said noise frequency components in said output of said second amplifying means; and means supplied with the output of said second amplifying means for detecting the presence or absence therein of said signals from target objects.

2. In a noncoherent doppler radar system comprising means for transmitting time-spaced pulses of electrical energy, means for receiving reflections of said transmitted pulses from reference objects and from target objects moving with respect to said reference objects to produce received signals, first variable-gain amplifier means for amplifying said received signals, gating means for selectively passing received signals produced by objects in different sequentially-selected range bins in response to different ones of said transmitted pulses, first AGC means responsive to the output of said gating means to vary the gain of said first variable-gain amplifier means in the sense to reduce said gain when the strength of said reflections from reference objects in the selected range bin increases; and first filter means for selectively enhancing frequency components in the output of said gating means which are in or adjacent the spectral band produced by said target objects, the improvement comprising:

second variable-gain amplifier means supplied with the output of said first filter means;

second AGC means responsive to those frequency components of noise in the output of said second variable-gain amplifier means which are situated adjacent but outside said spectral band, for varying the gain of said second AGC means in the sense to maintain substantially constant the level of said noise frequency components in the output thereof; and means responsive to the output of said second AGC means for sensing changes therein due to the presence or absence of signals due to target objects.

3. Automatic detection apparatus for use with a noncoherent doppler radar of the type which produces a combined output signal comprising clutter-signal frequency components of variable strength and frequency-spread occupying a first spectral band, moving-target signal frequency components in a second spectral band doppler-shifted upward in frequency with respect to said clutter-signal frequency components to an extent dependent upon the velocities of target objects, and noise-signal frequency components of variable level and occupying a third spectral band extending within and above said second spectral band, said apparatus comprising:

noise AGC means supplied with said combined output signal for producing a corresponding output signal in which said noise level is substantially constant;

clutter-control means supplied with the output of said noise AGC means for automatically providing an increased attenuation of said clutter-signal components in the higher-frequency portion of said first spectral band when the energy of said last-named components increases above a predetermined level; and energy-threshold means for producing an output signal in response to increases above a threshold value of the energy of the output from said clutter-control means.

4. Apparatus in accordance with claim 3, in which said noise AGC means comprises variable-gain means, and first filter means selectively responsive to noise frequency components outside said second spectral band for developing and applying to said variable-gain means a gain-control signal to maintain said noise level substantially constant in the output of said variable-gain means; and in which said clutter-control means comprises second filter means having a lower-frequency skirt which is controllably variable in frequency position in the higher-frequency portion of said first spectral band and third filter means for selecting frequency components in said higher-frequency portion of said first spectral band for producing and applying to said second filter means a control signal to vary the frequency position of said skirt.

\* \* \* \* \*